UNITED STATES PATENT OFFICE.

FREDERICK C. WINKLER, OF VICTORIA, BRITISH COLUMBIA, CANADA.

ANTIFRICTION-BEARING COMPOUND.

1,015,920. Specification of Letters Patent. Patented Jan. 30, 1912.

No Drawing. Application filed April 6, 1911. Serial No. 619,397.

*To all whom it may concern:*

Be it known that I, FREDERICK C. WINKLER, citizen of the Dominion of Canada, residing at Victoria, in the Province of British Columbia, Canada, have invented a new and useful Antifriction-Bearing Compound, of which the following is a specification.

This invention relates to an anti-friction composition for use in engine or machine bearings but susceptible of adaptation to any purpose, such as for piston or piston rod packing, where a necessity is experienced for a strong durable anti-friction material.

The composition and the manner of preparing and applying it in use is particularly described in the following specification.

The compound consists of powdered or flake graphite, magnesium carbonate and chlorid of magnesia.

The graphite is well known as possessing anti-friction properties in a high degree and the carbonate of magnesia when reacted on with chlorid of magnesia sets as a strong hard cement that is free from abrasive action. The powdered or flake graphite and magnesium carbonate are preferably mixed in the proportion of approximately half of each by volume, and sufficient of the chlorid of magnesia is added to form the compound into a stiff paste. The chlorid of magnesia reacting on the carbonate of magnesia forms, when set, a strong cement which binds the particles of graphite together, and the surface of the compound, when exposed to friction, is susceptible of receiving a high polish and has a very low co-efficient. Where greater strength is required, asbestos fiber may be mixed with the compound and will bind it together.

While in the plastic state, the compound may be molded or otherwise formed into any shape that may be required. In the case of an ordinary shaft bearing, it may be applied direct to the recess of the bearing box and the bearing surface molded either to the shaft itself or to a corresponding form mold. In either case the molding surface should be accurately turned and have a highly finished surface to give the best results. Where a heavy or variable load is to be imposed on the bearing the anti-friction material may be filled into strip recesses in the body of a bronze bearing in which case the graphite will quickly fill the pores of the bronze and film the surface of the bearing; or it may be molded into bushes, segments or plates as circumstances may require.

While I prefer to use the graphite and magnesium carbonate in equal parts say, for example, fifty parts of the graphite to fifty parts of the magnesium carbonate, proportions of the ingredients may be varied within wide limits without departing from the spirit of the invention and the chlorid of magnesia may be diluted with water in which case, the reaction being slower, the compound will take longer to set.

The essential feature of the invention lies in the combination of the graphite with the carbonate of magnesia and the reduction of the same to a hard setting paste by the addition of chlorid of magnesia.

Having now particularly described my invention and the manner of its use, I hereby declare that what I claim as new and desire to be protected in by Letters Patent, is:

1. As an anti-friction material, powdered or flake graphite bonded with magnesium carbonate cement.

2. As an anti-friction compound, the combination of graphite and magnesium carbonate reduced to a paste with chlorid of magnesia.

3. An anti-friction composition composed of powdered or flake graphite 50 parts, associated with magnesium carbonate 50 parts and chlorid of magnesia.

4. An anti-friction composition, consisting of powdered or flake graphite with a fibrous bond and magnesium carbonate cement.

5. An anti-friction composition, consisting of powdered or flake graphite and fibrous asbestos cemented with magnesium carbonate combined with chlorid of magnesia.

6. As an anti-friction compound, the combination of graphite and magnesium carbonate in equal parts, reduced to a paste with chlorid of magnesia.

In testimony whereof I have signed my name to this specification in the presence of two subscribing witnesses.

FREDERICK C. WINKLER.

Witnesses:
 ROWLAND BRITTAIN,
 WM. S. SOUTAR.